United States Patent [19]

Miller et al.

[11] Patent Number: 5,626,990
[45] Date of Patent: May 6, 1997

[54] RECOMBINANT LEAD ACID BATTERY AND METHOD OF MAKING SAME

[75] Inventors: Robert B. Miller, San Jose; Larry F. Miller, Los Gatos, both of Calif.

[73] Assignee: Portable Energy Products, Inc., Scotts Valley, Calif.

[21] Appl. No.: 596,400

[22] Filed: Feb. 2, 1996

[51] Int. Cl.$^6$ ........................................ H01M 2/14
[52] U.S. Cl. ........................ 429/247; 429/153; 429/210; 429/225
[58] Field of Search .................................. 429/153, 149, 429/162, 163, 122, 121, 210, 225, 176, 177

[56] References Cited

U.S. PATENT DOCUMENTS

| | | | |
|---|---|---|---|
| 4,996,128 | 2/1991 | Aldecoa et al. | 429/153 |
| 5,374,490 | 12/1994 | Aldecoa | 429/152 |

OTHER PUBLICATIONS

D.A.J. Rand, A.F. Hollenkamp, and R.F. Nelson; "Competing Theories of Premature Capacity Loss—Running Down a Battery Killer?"; Sep., 1993; The Battery Man.

H. Dietz, et al., "Premature capacity loss in lead/acid batteries with antimony-free ..." *J. Power Sources*, 46, (1993) 191–202 (month N/A).

D. Pavlov, "Suppression of premature capacity loss by methods based on the gel–crystal ..." *J. Power Sources*, 46 (1993) 171–190 (month N/A).

D. Pavlov, "Premature capacity loss (PCL) of the positive lead/acid battery plate ..." *J. Power Sources*, 42 (1993) 345–363 (month N/A).

M.K. Dimitrov and D. Pavlov, "Location of the phenomena of premature capacity loss during cycling ..." *J. Power Sources*, 46 (1993) 203–210 (month N/A).

L. Apateanu, A.F. Hollenkamp and M.J. Koop, "Electrolyte stratification in lead/acid batteries ..." *J. Power Sources*, 46 (1993) 239–250 (month N/A).

E. Meissner and H. Rabenstein, "Reversible capacity decay of $PbO_2$ electrodes ..." *J. Power Sources*, 40 (1992) 157–167 (month N/A).

A. Winsel and E. Bashtavelova, "The agglomerate–of–spheres model ..." *J. Power Sources*, 46 (1993) 211–217 (month N/A).

E. Bashtavelova and A. Winsel, "$PbO_2$ active material as an electrocrystalline network" *J. Power Sources*, 46 (1993) 219–230 (month N/A).

E. Meissner, "Influence of recharge potential and acid concentration on the discharge ..." *J. Power Sources*, 46 (1993) 231–238 (month N/A).

E. Voss, "Effects of phosphoric acid addition on the behaviour of the Lead/Acid Cell ..." *J. Power Sources*, 24 (1988) 171–184 (month N/A).

(List continued on next page.)

*Primary Examiner*—M. Nuzzolillo
*Attorney, Agent, or Firm*—Hickman Beyer & Weaver

[57] ABSTRACT

A recombinant lead acid battery is provided having positive and negative plates coated with active material and separated by a compressible separator material containing an electrolyte. A casing provides structural support for the plates and encases the battery's components. The battery is preferably a recombinant lead acid battery with its plates being formed of lead foil sheets. The casing is reinforced and arranged to i) maintain a substantially evenly distributed compressive force on the separator material and ii) maintain a constant spacing between the plates. The battery is arranged to maintain a compressive force of at least eight psi on the plates which has been found to significantly reduce the incidence of premature capacity loss (PCL). By way of example, compressive forces in the range of 8–14 psi work well for conventional separator materials. In one embodiment, the casing includes a plurality of reinforcing support pins extending between upper and lower casing members through the plates and separator material for maintaining the evenly distributed pressure. Plates may be stacked one above another to provide a plurality of cells. A method of making the battery is also described.

14 Claims, 4 Drawing Sheets

OTHER PUBLICATIONS

E. Meissner and E. Voss, "Reversible capacity decay of positive electrodes in lead/acid cells" *J. Power Sources*, 33 (1991) 231–244 (month N/A).

U. Hullmeina, E. Voss and A. Winsel, "Behaviour of the $PbO_2/PbSo_4$, electrode with regard to charging regime and small additions of . . ." *J. Power Sources*, 30 (1990) 99–105 (month N/A).

E. Voss, U. Hullmeine and A. Winsel, "Behaviour of the $PbO_2/PbSo_4$ electrode in sulphuric acid containing tin ions" *J. Power Sources*, 30 (1990) 33–40 (month N/A).

RECOMBINANT LEAD ACID BATTERY AND METHOD OF MAKING SAME

BACKGROUND OF THE INVENTION

The present invention relates generally to recombinant lead acid batteries. More particularly, the invention relates to a rechargeable recombinant lead acid battery having positive and negative plates coated with active material and separated by a compressible separator material containing an electrolyte. A casing provides structural support for the plates and encases the battery's components in such a way that the casing maintains a substantially evenly distributed compressive force on the separator material substantially greater than the pressures normally found within a typical recombinant lead acid rechargeable battery.

The most common and probably the best known battery chemistry is lead acid. One advantage of lead acid batteries is that they have very repeatable power delivery characteristics and may be recharged and overcharged repeatedly with minimal damage to the cells. Additionally, the power curve is consistent enough that the charge remaining in a cell at any given time can be relatively accurately predicted by merely measuring the cell's potential. Thus, a user can be easily warned well in advance of a loss of power. A significant improvement to the traditional lead acid battery design is the recombinant battery. The recombinant lead acid battery differs from its predecessors in that substantially all of the electrolyte is absorbed within the separator between adjacent plates and/or an active paste applied directly to the plates. Gases evolved during operation or charging are not normally vented into the atmosphere, but rather are induced to recombine within the battery. With such an arrangement, no free acid is available, which allows the battery to be sealed and maintenance free. The elimination of free acid also provides a safer battery design.

An important technical requirement of lead acid batteries is that the spacing between plates must be maintained at a constant distance. As is well known in the art, if the plates of a lead acid battery are not sufficiently constrained, the plates will expand and the battery degrades relatively quickly. Accordingly, the casing must be sufficiently strong to prevent separation of the plates under the influence of the considerable forces that can act on the plates during a charge/discharge cycle. Two areas of prior art recombinant batteries are particularly bulky and/or heavy. The first is the electrodes which are typically fabricated from lead grids and the second is the casing structure which is typically heavily reinforced. A significant improvement in the traditional recombinant lead acid battery design was disclosed in applicant's U.S. Pat. No. 4,996,128 which described a recombinant lead acid battery having battery plates that are formed from metallic foils. As illustrated in FIG. 1, the battery described in the '128 patent and generally indicated by reference numeral 20 has matching upper and lower external casing members 22 and 24 and a terminal arrangement 30. The internal structure includes spaced apart positive and negative plates 42 and 44 which are pasted with active materials 45 and 47 respectively. A separator 49 electrically isolates the plates. A multiplicity of pins 50 extend through the plates and separator to internally support the casing in order to maintain a constant spacing between the plates during operation and recharging. The pins 50 are formed from complementary pin portions 52 and 54 which are integrally formed with the upper and lower casing members 22 and 24 respectively. This structure provides a lightweight battery with high energy and packaging densities.

Although the arrangement disclosed in the '128 patent is quite advantageous compared to other conventional lead acid batteries, it, along with other recombinant lead acid batteries, is susceptible to a phenomenon referred to as Premature Capacity Loss (PCL). This phenomenon refers to a rapid reduction in the dischargeability of fully charged positive plate material much earlier in the life of the battery than expected. Several theories have been put forth to explain PCL. However, no precise understanding of the mechanism causing PCL as yet been discovered and agreed upon.

PCL is not to be confused with the cycle life and the normal, expected degradation of a rechargeable lead acid battery. Cycle life typically refers to the expected number of times a rechargeable battery may be discharged and recharged before the normal or expected degradation of the active materials within the battery adversely limit the batteries performance. To the contrary, PCL occurs much earlier in the expected life of the battery and is not typified by the expected degradation of the active materials associated with normal cycle life degradation. Accordingly, there is a need for an improved battery design that reduces the chances of the PCL phenomenon occurring within the battery.

SUMMARY OF THE INVENTION

As will be described in more detail hereinafter, a recombinant lead acid battery is provided having positive and negative plates coated with active material and separated by a compressible separator material containing an electrolyte. A casing provides structural support for the plates and encases the battery's components. The casing is reinforced and arranged to i) maintain a substantially evenly distributed, relatively high compressive force of at least approximately 8 psi on the separator material and ii) maintain a constant spacing between the plates. A method of producing the battery is also disclosed. Applicant has found that this higher pressure reduces the likelihood of the PCL phenomenon occurring. In some preferred embodiments, compressive forces of at least approximately 8 psi, as for example in the range of approximately 8 to 14 psi are used.

In one embodiment, the casing includes a plurality of reinforcing support pins extending between upper and lower casing members. The support pins extend through the plates and separator material and support the casing maintaining the evenly distributed pressure and maintaining the constant spacing between the plates. In a preferred embodiment, the pins are formed from complementary pin portions that extend inward from the opposing upper and lower casing members respectively. The pin portions may be formed integrally with the upper and lower casing members.

In an alternative embodiment of the battery, a plurality of stacked cells are formed by stacking pasted planer plates one above another with separators in between the adjacent plates. In an alternative aspect of the invention, a recombinant polar lead acid battery is formed wherein one or more polar plates are positioned between positive and negative plates formed from a sheet of lead foil. The polar plates are also formed of lead foil and have positive and negative surfaces. The resultant battery has multiple cells that are combined in series to form a higher potential battery. Still another embodiment contemplates the use of external reinforcements to maintain the desired compressive force.

BRIEF DESCRIPTION OF THE DRAWINGS

The features of the present invention may best be understood by reference to the following description of the presently preferred embodiments together with the accompanying drawings in which.

DETAILED DESCRIPTION OF THE PREFERRED EMBODIMENTS

Figure 1:
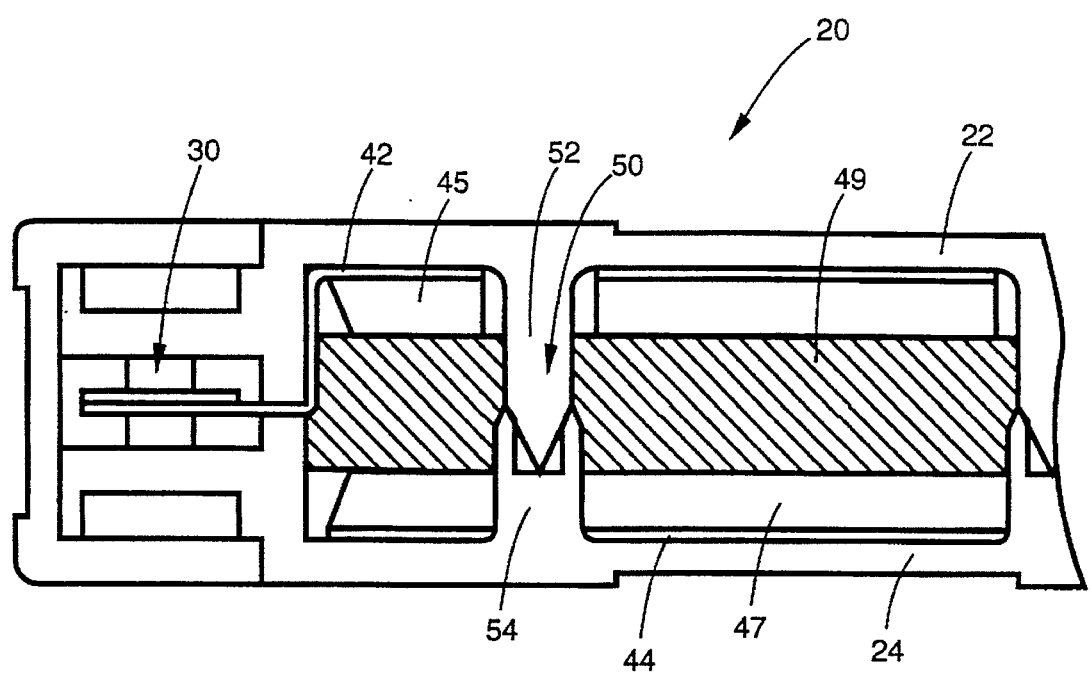
FIG. 1 is a cross-sectional view of a previous foil sheet based battery unit that was co-developed by the present inventor.

As illustrated in the drawings, the embodiment of the invention chosen for the purposes of illustration is a planar recombinant lead acid battery generally indicated by reference numeral 55. In this preferred embodiment, the battery takes the form of a single cell battery having non-self-supporting lead foil plates and a casing structure similar to the battery described in applicant's U.S. Pat. No. 4,996,128 which is incorporated herein by reference. Although the invention will be described using the example of a battery that utilizes a single cell lead foil plate structure, this is not a requirement. Instead, the present invention is believed to be equally applicable to all types of recombinant lead acid batteries regardless of the specific configuration of the plates, active material, and separator material used to make up the battery.

Figure 2:
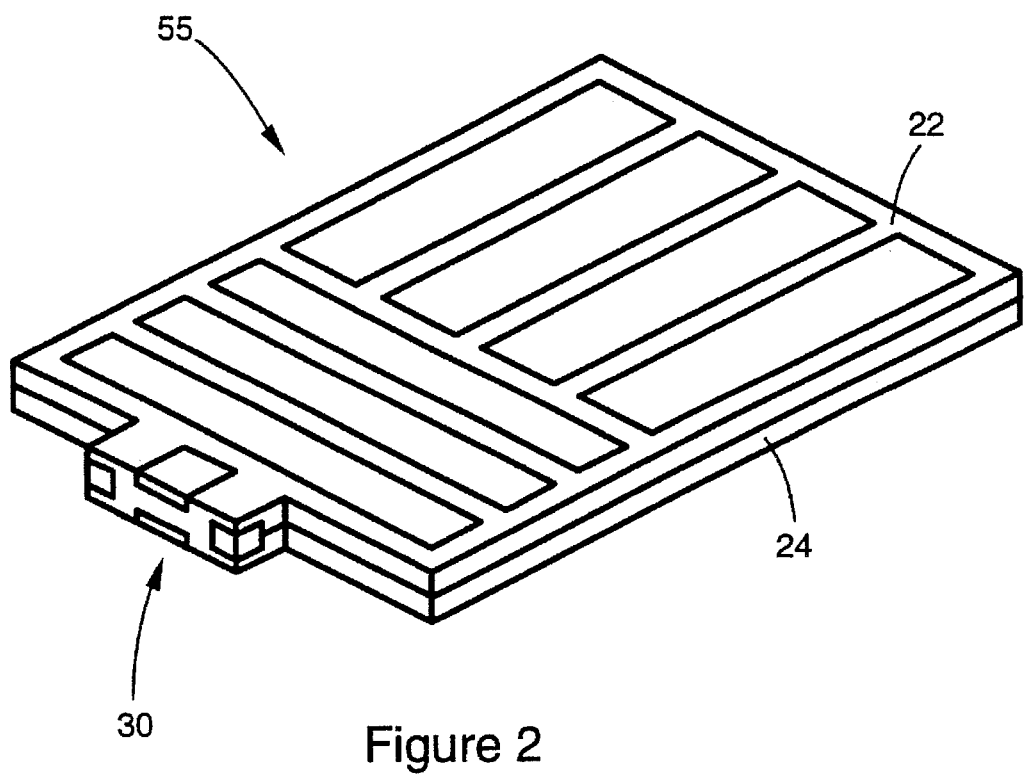
FIG. 2 is a perspective view of a battery fabricated in accordance with the present invention.
Figure 4:
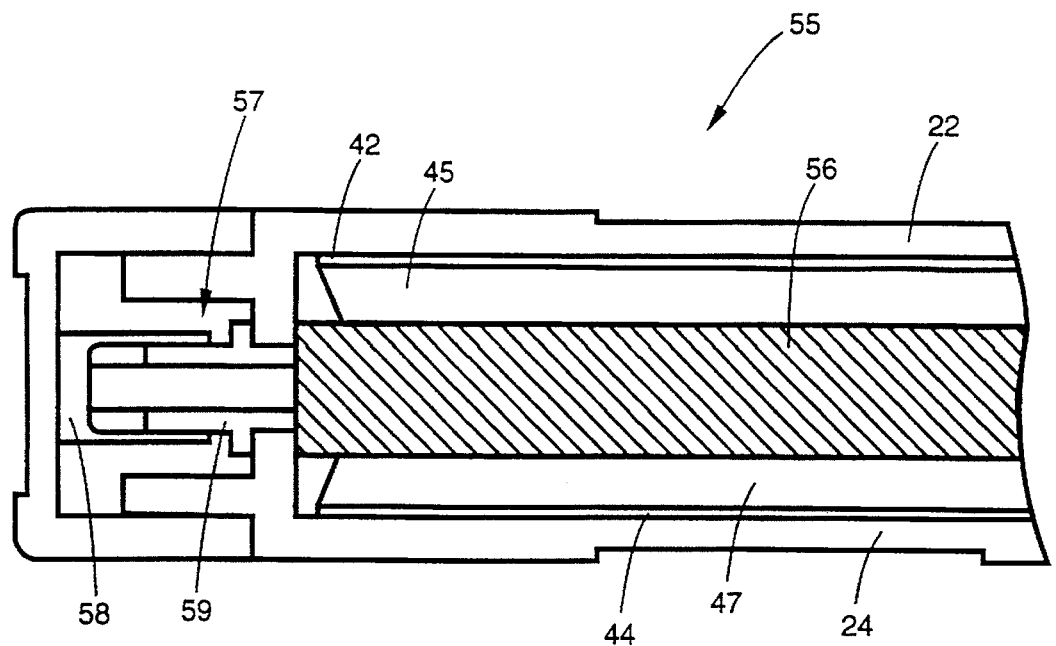
FIG. 4 is a diagrammatic cross sectional side view of the terminal end of the battery shown in FIG. 1 taken along line 4—4.
Figure 5:
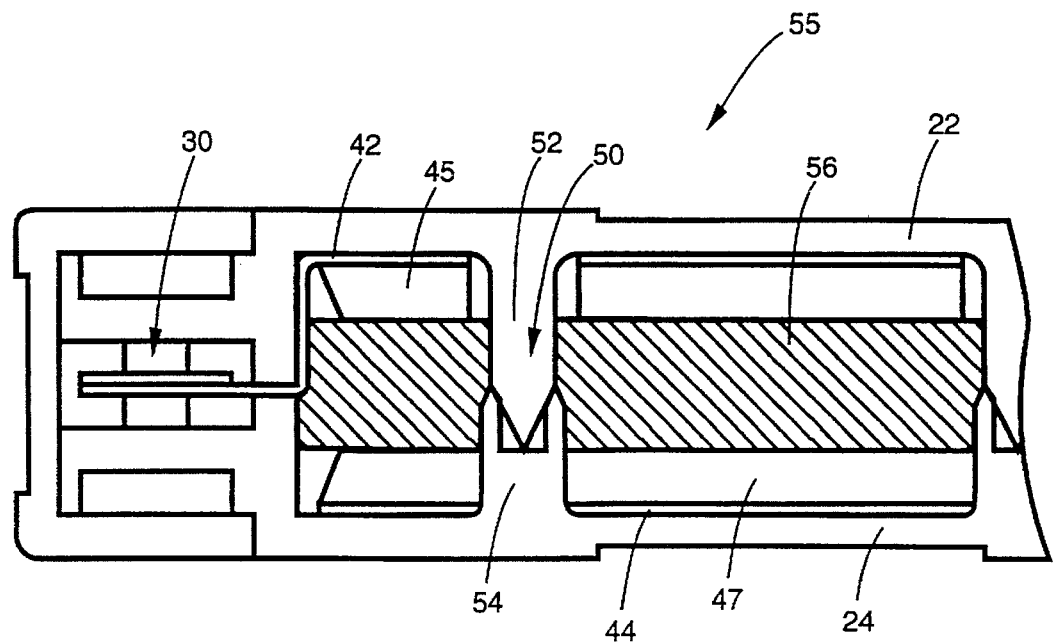
FIG. 5 is a diagrammatic cross sectional side view of the terminal end of the battery shown in FIG. 1 taken along line 5—5.

As seen in FIG. 2, the battery has matching external upper and lower casing members 22 and 24 and a terminal arrangement 30. Although one particular terminal arrangement is illustrated, the invention is not limited to this arrangement. Any of a variety of terminal arrangements would equally fall within the scope of the invention. Referring next to FIGS. 4 and 5, the internal structure includes spaced apart positive and negative plates 42 and 44 which are pasted with active materials 45 and 47 respectively. A compressible separator material 56 electrically isolates the plates. In the same manner as described in the referenced patent, a multiplicity of support columns or pins 50 extend through the plates and separator material to support the casing in order to maintain a constant spacing between the plates during operation and recharging. The pins 50 are formed from complementary pin portions 52 and 54 which are integrally formed with the upper and lower casing members 22 and 24 respectively.

As discussed above, it is important to reinforce the casing to maintain a constant spacing between the plates. Also, in accordance with the invention, the casing must be capable of exerting a substantially evenly distributed compressive force on the separator material 56 which is substantially greater than is typically found in conventional batteries. Since it is contemplated that the casing of this embodiment will be fabricated from a light weight and relatively inexpensive plastic material, the pins 50 are provided in order to provide internal structural support to the casing. It should be apparent that internal pins are a much lighter mechanism for supporting casing walls and maintaining the required evenly distributed compressive force then merely thickening the walls to obtain the desired strength as has been extensively practiced in prior art battery designs.

Figure 3:
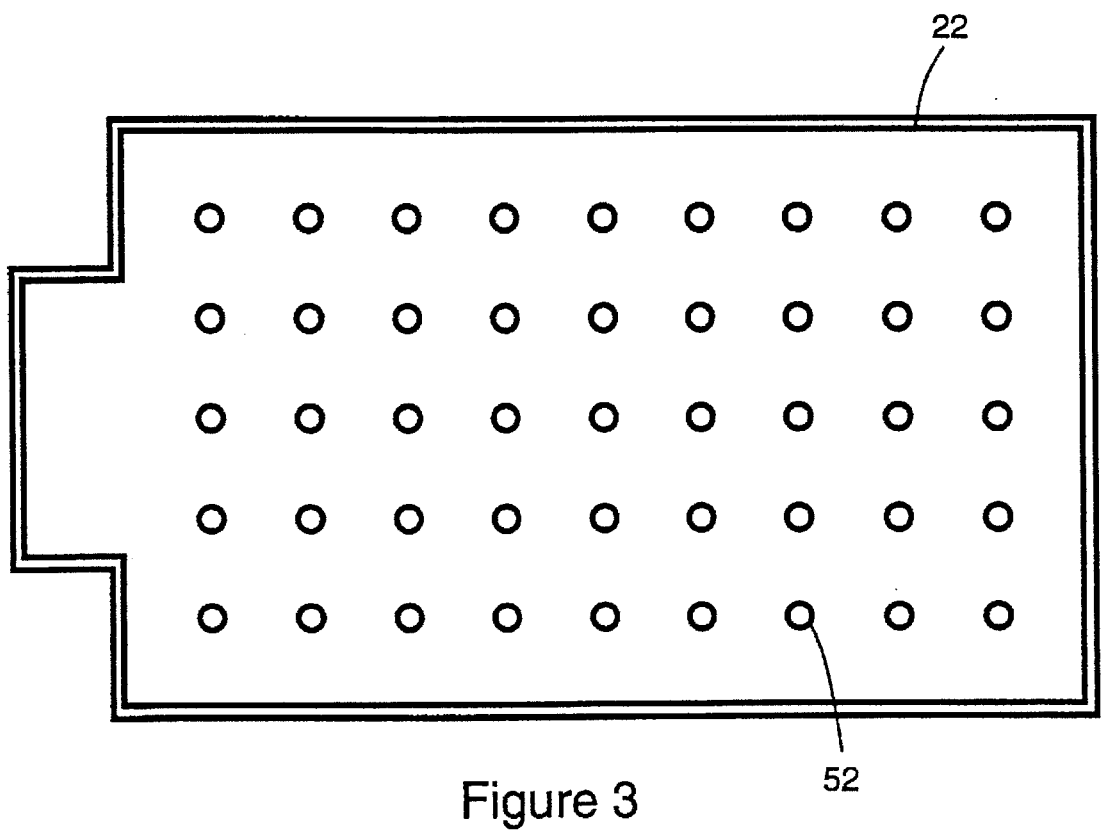
FIG. 3 is a bottom view of a representative upper casing member.

As seen in FIG. 3, the upper casing 22 has a matrix of male pin portions or posts 52 that extend inward from its interior surface. The lower casing 24 is similarly formed except that it has female pin portions or posts 54 designed to receive the upper casing post 52. The posts 52 and 54 are arranged such that they mate when the battery is assembled. Once the battery is fully assembled as described below, the posts are joined together. In the described embodiment, the casing members 22 and 24 are formed from plastic and the posts are ultrasonically welded together to form continuous pins. At the same time, the upper and lower casing members are ultrasonically welded together to seal the battery. The actual spacing of the pins 50 will vary a great deal depending upon the requirements of a particular battery. By way of example, one half inch centers have proven to be an effective spacing for typical planer battery designs.

In this embodiment, the positive and negative plates 42 and 44 are formed from sheets of lead foil. The lead foil is not a structural member and can therefore be of a high purity and extremely thin. Since the foil is very thin, it is formed as a substantially continuous sheet of foil as opposed to a grid structure which is common in prior art lead acid battery plates. Although thinner sheets are generally preferable to thicker sheets, (since they are lighter in weight), in practice sheets of any thickness could be used. By way of example, suitable foil thickness' of less than 0.01 inches may be used.

The plates 42 and 44 are each pasted with a suitable active material that includes a large amount of lead based compounds and/or free lead. Paste mixtures typical to conventional recombinant lead acid batteries may be used. A compressible, porous separator material that is capable of absorbing and retaining large amounts of free electrolyte is used as separator 56. A suitable separator material is a conventional high porosity microporous fiberglass. Commercially available microporous fiberglass having interior openings occupying over 90% of the materials volume work well. One of the important functions of the separator is to maintain a constant spacing between the batteries plates.

In accordance with the present invention, the separator 56 is resilient and when compressed exerts a resilient force. Therefore, before the assembly of the battery, the separator material has a predetermined thickness which is greater than the space available between the pasted plates of the battery when the battery is assembled. This predetermined thickness determines the compressive pressure resulting within the assembled battery. As the battery of the invention is assembled, the separator is compressed between the pasted plates such that a desired compressive force is maintained and substantially evenly distributed over the entire area of separator material 56. Therefore, the separator material exerts a continuous force pushing against the plates to maintain the desired minimum plate spacing and, in accordance with the invention, to maintain the desired internal pressure on the separator material itself.

Applicants have found that increasing the compressive force on the separator material 56 reduces the chances of the PCL phenomenon occurring. The pressures observed to have a beneficial effect are pressures which are substantially greater than the pressures recommended for use by the manufacturers of the separator material. For example, manufactures of the conventional high porosity microporous fiberglass mentioned above typically recommend compressive pressures in the range of about 3–4 psi. Applicants have found that pressures of at least about 8 psi appear to significantly reduce the likelihood of the PCL phenomenon occurring.

As the compressive force on the separator material is further increased, the likelihood of the PCL phenomenon seems to be further reduced. However, with currently available separator materials the pressure can only be increased to a certain point before the separator material begins to break down. For typical separator materials, this pressure at which the separator material begins to break down is about 15 psi. Because of this, applicants have found that pressures in the range of 8–14 psi seem to be most effective for currently available separator materials. It is suspected that further reductions in the PCL phenomenon may be achieved by using even higher pressures if and when higher integrity separator materials capable of withstanding greater pressures become available.

By increasing the pressure on the separator material and thereby reducing the likelihood of the PCL phenomenon, the yield of the batteries produced which actually obtain the expected cycle life is significantly improved. This allows the batteries to be produced at a lower cost per functional battery. In addition to this benefit of reducing the likelihood of the PCL phenomenon occurring, applicant has found that the higher pressures of the present invention may also increase the expected cycle life of the battery.

When assembling the described battery, a suitable matrix of holes 55 is punched into each plate 42 and 44 in order to fit over the posts 52 and 54 respectively. Otherwise the foil forms a substantially continuous sheet as opposed to a conventional grid structure. It should be appreciated that the foil nature of the plates makes it extremely easy to punch the desired matrix of holes.

It is generally desirable to supply the battery with as much electrolyte as possible without flooding the battery. That is, all of the electrolyte added should be retained within the separator material 56 and the active materials 45 and 47. Thus, when the battery is filled with electrolyte, care must be taken to insure that the correct amount of electrolyte is added. Although recombinant lead acid technology is used to fabricate the battery, at times overcharging or malfunctions of the battery may lead to the generation of significant amounts of free gases within the internal cavity of the battery. Accordingly, a conventional pressure relief device 57 is provided to release the gases in the event of a significant over pressurization. In the embodiment shown in FIG. 4, the pressure relief device is a conventional Bunsen valve having a rubber cap 58 journaled over one end of a plastic pipe 59. The opposite end of plastic pipe 59 opens into the interior of the battery casing.

Although the present invention has been described to this point as in terms of a single cell battery embodiment, this is not a requirement. In fact, the battery may take a wide variety of forms including, but not limited to, multicell batteries, stacked cell batteries and bipolar batteries. The described improvement is equally applicable to such battery constructions as well. Suitable stacking approaches are described in the applicant's prior U.S. Pat. Nos. 4,996,128 and 5,374,490 which are incorporated herein by reference. The '490 patent discloses various multicell modules that rely on external reinforcement mechanisms and which utilize opposing coverplates as the terminals. In such multi-cell arrangements, the important thing is to size the separators properly to provide the desired overall compressive forces.

Figure 6:
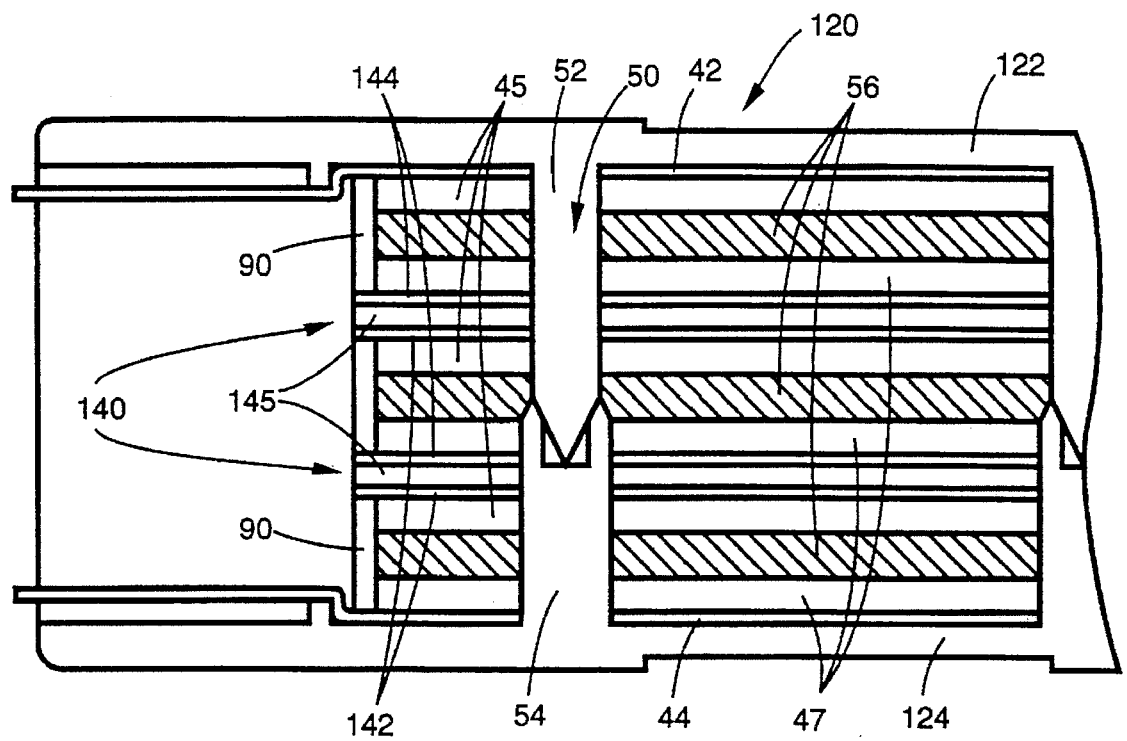
FIG. 6 is a diagrammatic cross sectional side view of an alternate embodiment of the present invention which uses a multicell dual plate configuration.

Referring next to FIG. 6, one particular multi-cell battery construction will be described. A three cell, 6 volt battery 120 is constructed having a positive plate 42 carried by upper casing member 122 and a negative plate 44 carried by lower casing member 124. As in the previous described embodiment, the plates are pasted with a conventional active material. Additional cells are formed by inserting dual plate structures 140 between the spaced apart positive and negative plates 42 and 44 with compressible separator material 56 being placed between adjacent dual plate structures 140 as well as between the outer dual plate structures and plates 42 and 44 respectively.

The dual plate structures 140 are formed by placing a pair of lead foils 142 and 144 on opposite sides of a separating wall. One of the lead foils (foil 144) is pasted with a negative active material 47 while the other (foil 142) is pasted with a positive active material 45. The back to back foils are placed below the positive plate 42 with a layer of compressible separator material 56 disposed between the positive plate 42 and the negative foil 144. Thus, the positive foil 142 faces towards the negative plate 44. At this point two cells have been formed. Additional cells are fabricated merely by stacking additional dual plate structures 140 below the first and inserting layers of compressible separator material 56 between the additional dual plate structures as seen in FIG. 6. In that figure, three cells are formed by placing two dual plate structures 140 between the spaced apart positive and negative plates 42 and 44.

Of course, layers of compressible separator material 56 are positioned between adjacent dual plate structures in order to maintain the desired plate spacing. Similarly, layers of separator material 56 are positioned between the top dual plate structure and the positive plate 42, as well as between the bottom dual plate structure and the negative plate 44. The battery is assembled by compressing and encasing the stack of plates, dual plate structures, active material, and separator material within casing members 122 and 124 such that separator material 56 is compressed with a desired higher compressive force. Casing members 122 and 124 include pin portions 52 and corresponding pin portions 54 extending from casing members 122 and 124 respectively. Each of the associated pin portions 52 and 54 are structurally connected, in this case by ultrasonic welding, to form support pins 50. Pins 50 support casing members 122 and 124 and compress each of the layers of separating material such that each layer of separator material is maintained at the substantially evenly distributed higher pressures described in detail above.

Figure 7:
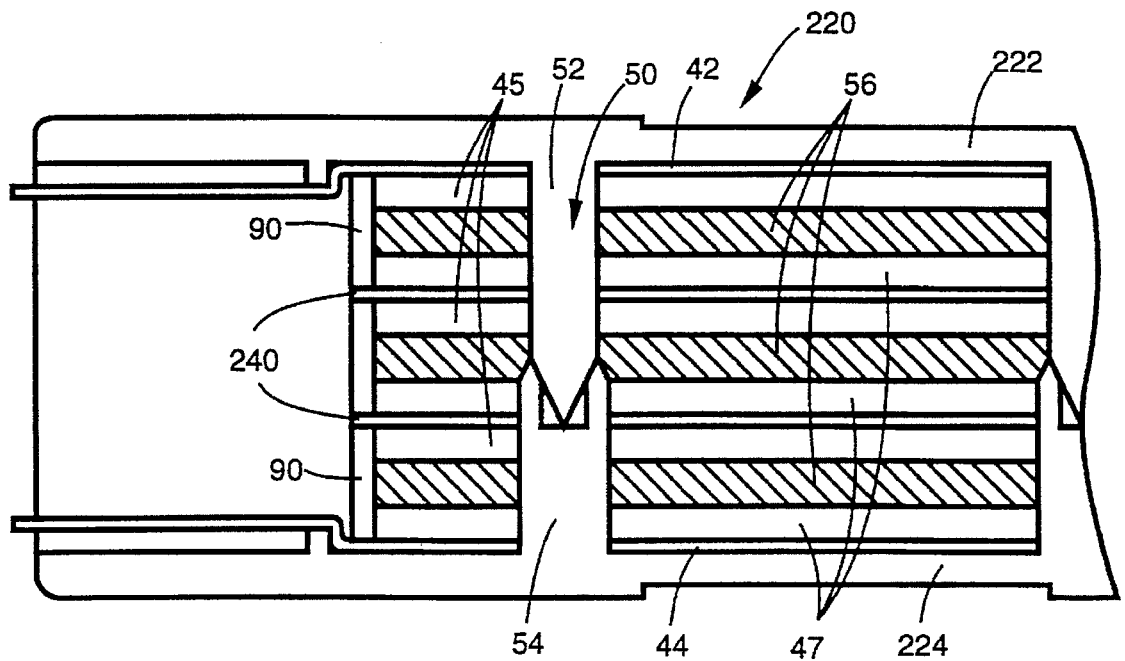
FIG. 7 is a diagrammatic cross sectional side view of another alternate embodiment of the present invention which uses a multicell polar plate construction.

Referring next to FIG. 7, a polar battery having a single continuous foil acting as a positive plate for a first cell and a negative plate for an adjacent cell will be described. Alternatively, the polar plate may have a pair of back to back mounted foils. The polar battery 220 closely resembles the multicell battery described above with respect to FIG. 6 except the separating walls are eliminated. One side of the polar plate 240 is pasted with a positive active material 45, while the opposite side is pasted with a negative active material 47. The use of a polar plate eliminates the need to electrically couple serially connected cells. In all other manners the polar battery may be formed in exactly the same way as the multicell battery previously described. Thus, the six volt battery shown in FIG. 9 has positive and negative pasted plates 42 and 44 which are placed against the upper and lower casing members 222 and 224 respectively. Two pasted polar plates 240 are stacked between the positive and negative plates with the negative sides of the polar plates facing the positive plate 42 and the positive sides of the polar plates facing the negative plate 44. The number of cells within the battery can be readily changed to provide any desired potential.

In the same way as described above, layers of compressible separator material 56 are positioned between adjacent polar plates in order to maintain the desired plate spacing. Similarly, layers of separator material 56 are positioned between the top polar plate and the positive plate 42, as well as between the bottom polar plate and the negative plate 44. The battery is assembled by compressing and encasing the stack of plates, polar plates, active material, and separator material within casing members 222 and 224 such that separator material 56 is compressed with a desired higher compressive force. Casing members 222 and 224 include pin portions 52 and corresponding pin portions 54 extending from casing members 222 and 224 respectively. Each of the associated pin portions 52 and 54 are structurally connected to form support pins 50. Pins 50 support casing members 222 and 224 and compress each of the layers of separating material such that each layer of separator material is maintained at the substantially evenly distributed higher pressures described in detail above. In embodiments having external reinforcements, the pins may be eliminated.

In practice, if the proper amount of electrolyte is used initially, virtually all of the electrolyte will remain absorbed within either the active paste materials 45 and 47 or the microporous separator material 56 via surface tension. Since virtually all of the electrolyte remains within the active material paste and the separator, there is very little migration of electrolyte between the back to back positive and negative pastes. Accordingly, it is not necessary to tightly seal the holes in the plates through which support pins 50 pass.

To prevent leakage of electrolyte between the adjacent cells, the plates may be cut such that they have slightly larger dimensions than the layers of separator material 56. Then isolation rings 90 having substantially the same thickness as the compressed layers of separator material 56 may be inserted around the various layers of separator material such that they are sandwiched between the adjacent dual plate structures as well as between the dual plate structures and the outer plate structures. The isolation rings 90 encircle the layers of separator material to maintain a good seal around the ends of the plate.

Although only a few embodiments of this invention have been described herein, it should be understood that the present invention may be embodied in many other specific forms without departing from the spirit or scope of the invention. Particularly, it should be appreciated that the internal support of the battery casing may be accomplished using many designs other than the described pin structure. The planer battery structure described is particularly well suited for stacking and has a high packaging density. However, it is contemplated that the advantages described herein may be applied to non-planer battery designs as well. Therefore, the present examples and embodiments are to be considered as illustrative and not restrictive, and the invention is not to be limited to the details given herein, but may be modified within the scope of the appended claims.

What is claimed is:

1. A recombinant lead acid battery comprising:
    a first and a second metallic plate;
    a first active paste material applied to the first plate;
    a second active paste material applied to the second plate, the second paste material being charged opposite the first paste material;
    an electrolyte saturated compressible separator material positioned between the first and second paste materials for isolating the first and second paste materials and for retaining an electrolyte; and
    a casing for enclosing the plates, separator, and active materials such that the casing compresses the separator material and maintains the separator material at a substantially evenly distributed pressure of at least approximately 8 psi.

2. A battery as recited in claim 1 wherein the pressure maintained on the separator material is within the range of approximately 8–14 psi.

3. A battery as recited in claim 1 wherein the separator material is a microporous fiberglass.

4. A battery as recited in claim 1 wherein the battery has a plurality of stacked cells.

5. A battery as recited in claim 1 wherein the casing includes internal pins extending between opposite sides of the casing through the plates for maintaining the substantially evenly distributed pressure on the separator material and a substantially constant spacing between the first and second plates during operation and recharging of the battery.

6. A battery as recited in claim 1 wherein the plates are formed of sheets of non-self-supporting sheets of lead foil.

7. A packaging arrangement for a recombinant lead acid battery having positive and negative plates, an active material and a compressible separating material containing an electrolyte, the packaging arrangement comprising:
    a casing arranged to encase the plates, active material, and separating material, the casing providing structural support for the plates and maintaining a substantially evenly distributed compressive force on the separator material of at least approximately 8 psi.

8. A method of packaging a recombinant lead acid battery having positive and negative plates, an active material and a compressible separator material containing an electrolyte, the method comprising the steps of:
    encasing the plates, active material, and separator material within a casing to form a battery cell such that the casing provides structural support for the plates and such that the casing maintains a substantially evenly distributed compressive force on the separator material of at least approximately 8 psi.

9. A method as recited in claim 8 wherein the pressure maintained on the separator material is within the range of 8–14 psi.

10. A method as recited in claim 9 wherein the step of encasing the plates, active material, and separator material includes the step of encasing a plurality of layers of the plates, active material, and separator material to form a multicell battery.

11. A method as recited in claim 9 wherein the separator material is a microporous fiberglass separator material.

12. A planar, recombinant lead acid battery comprising:
    first and second plates formed of non-self-supporting lead foil;
    a first active paste material applied to the first plate;
    a second active paste material applied to the second plate, the second paste material being charged opposite the first paste material;
    an electrolyte saturated, compressible, microporous fiberglass separator positioned between the first and second paste materials for isolating the first and second paste materials and for retaining an electrolyte; and
    a casing for enclosing the plates, separator, and active materials such that the casing compresses the separator material and maintains the separator at a substantially evenly distributed pressure within a range of approximately 8–14 psi, the casing including internal pins extending between opposite sides of the casing through the plates for maintaining the substantially evenly distributed pressure on the separator material and a substantially constant spacing between the first and second plates during operation and recharging of the battery.

13. A battery as recited in claim 12 wherein the battery has a plurality of stacked cells.

14. A method of packaging a planar recombinant lead acid battery having positive and negative plates formed from lead foil, an active material and a compressible microporous fiberglass separator material containing an electrolyte, the method comprising the steps of:

encasing the plates, active material, and separator material within a casing to form a battery cell such that the casing provides structural support for the plates and such that the casing maintains a substantially evenly distributed compressive force on the separator material of at least approximately 8 psi, wherein the compressive load is maintained at least in part through the use of internal pins extending between opposing sides of the casing.

* * * * *